United States Patent [19]

Meisel, Jr.

[11] 4,278,392
[45] Jul. 14, 1981

[54] LOG SKIDDER WITH FOLDING ARCH

[75] Inventor: Thomas C. Meisel, Jr., Peoria, Ill.

[73] Assignee: Caterpillar Tractor Co., Peoria, Ill.

[21] Appl. No.: 907,454

[22] Filed: May 19, 1978

[51] Int. Cl.³ ............................................. B66C 23/06
[52] U.S. Cl. .................................. 414/569; 212/255; 212/261
[58] Field of Search ............... 414/697, 700, 702, 710, 414/728, 742, 506, 569, 694, 707, 708, 711–713; 212/7, 8 R, 9

[56] References Cited

U.S. PATENT DOCUMENTS

| | | | |
|---|---|---|---|
| 1,909,689 | 5/1933 | Kuchar | 414/569 X |
| 2,980,271 | 4/1961 | Ulinski | 414/697 |
| 3,239,080 | 3/1966 | Corompt | 212/8 R X |
| 3,522,898 | 8/1970 | Rotheisler | 414/710 X |
| 3,606,060 | 9/1971 | Fleming et al. | 414/710 |
| 3,764,020 | 10/1973 | Batson | 212/7 |

Primary Examiner—Robert G. Sheridan
Attorney, Agent, or Firm—Wegner, Stellman, McCord, Wiles & Wood

[57] ABSTRACT

A log skidder including a vehicle having a frame with front and rear ends, ground engaging devices on the frame so that the vehicle may traverse the underlying terrain, an elongated boom on the frame and mounted thereto for pivotal movement about a generally horizontal axis between an upright position at least adjacent the rear end and a lower position intermediate the ends, a log engaging device, a lever mounting at one end the log engaging device and horizontally pivoted at a location remote from the lever one end to the boom at a location spaced from the horizontal axis, the lever one end extending rearwardly with relation to the frame, a motor on the frame for moving the boom between the positions thereof, and a linkage for maintaining the lever one end directed generally rearwardly for all positions of the boom on the frame.

6 Claims, 6 Drawing Figures

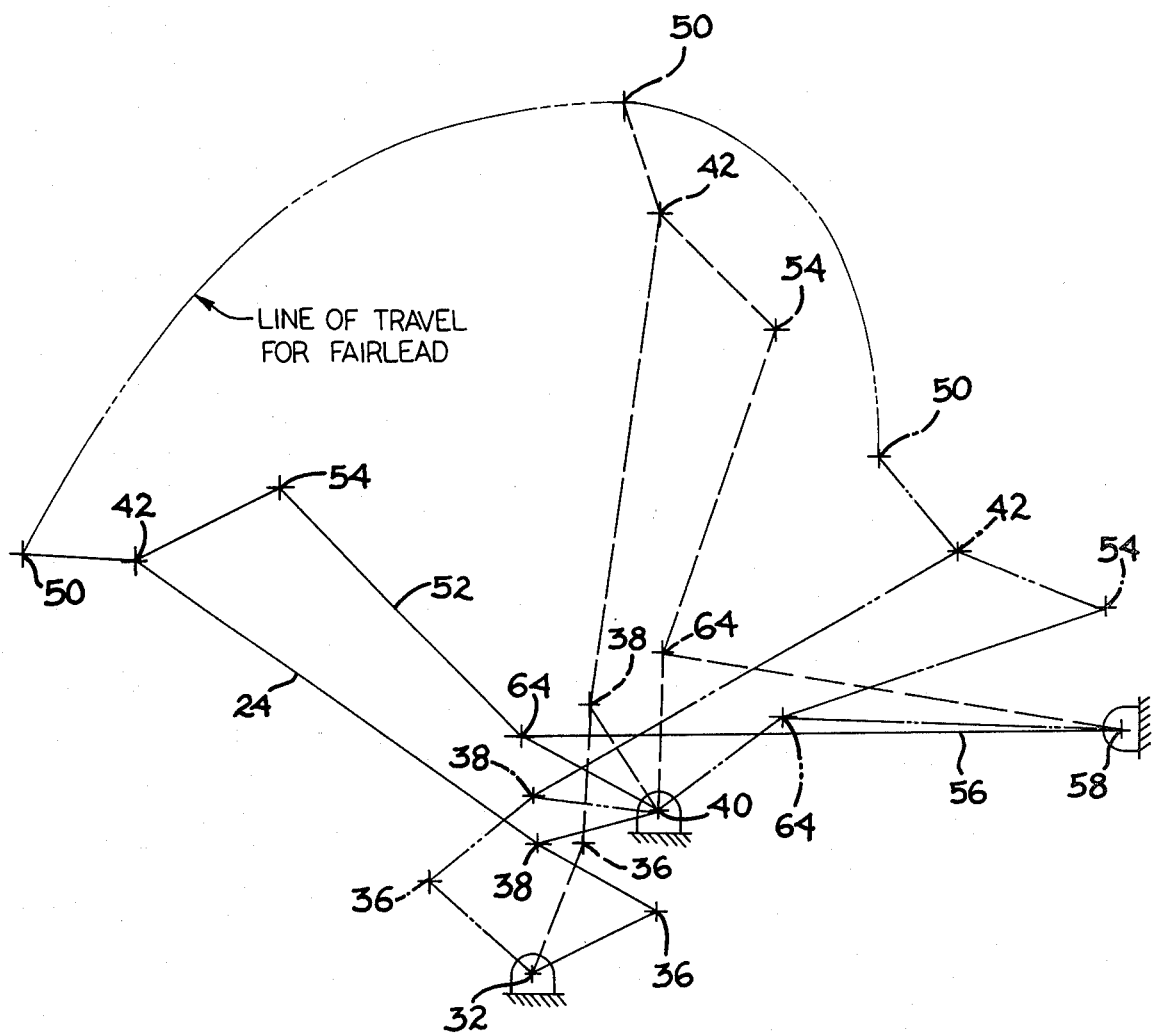

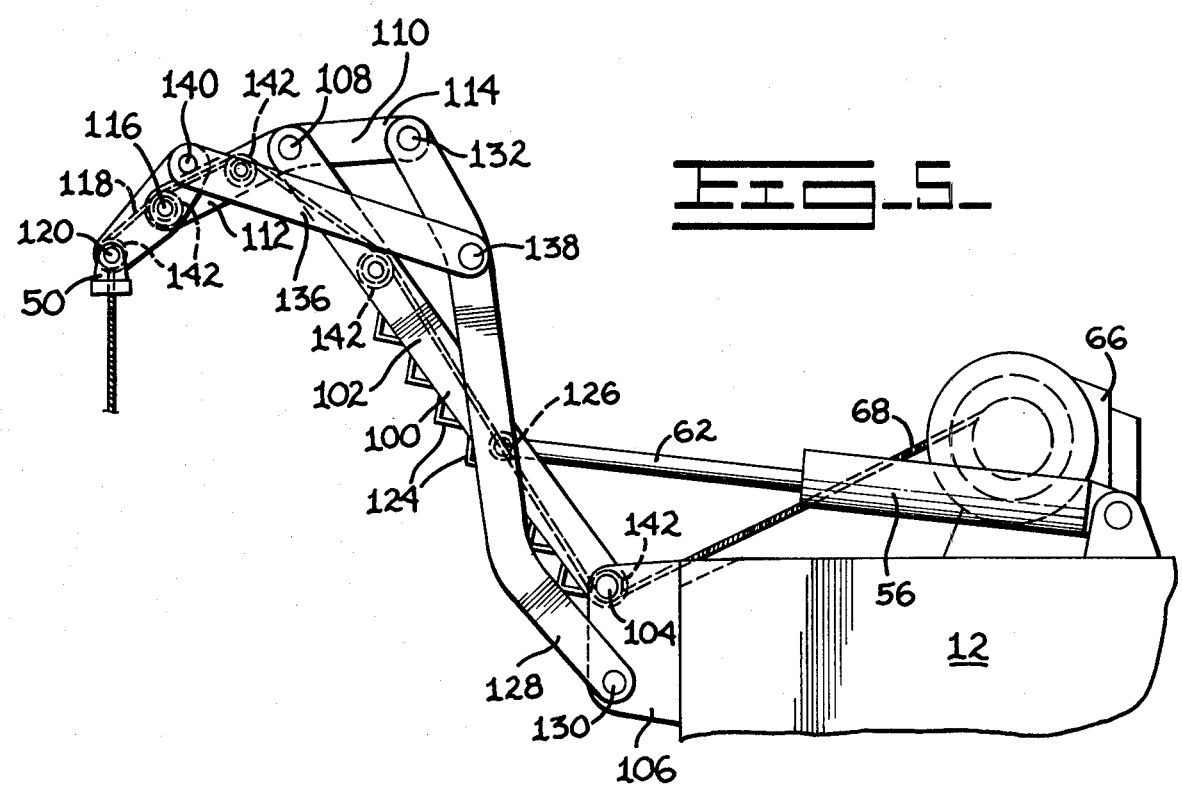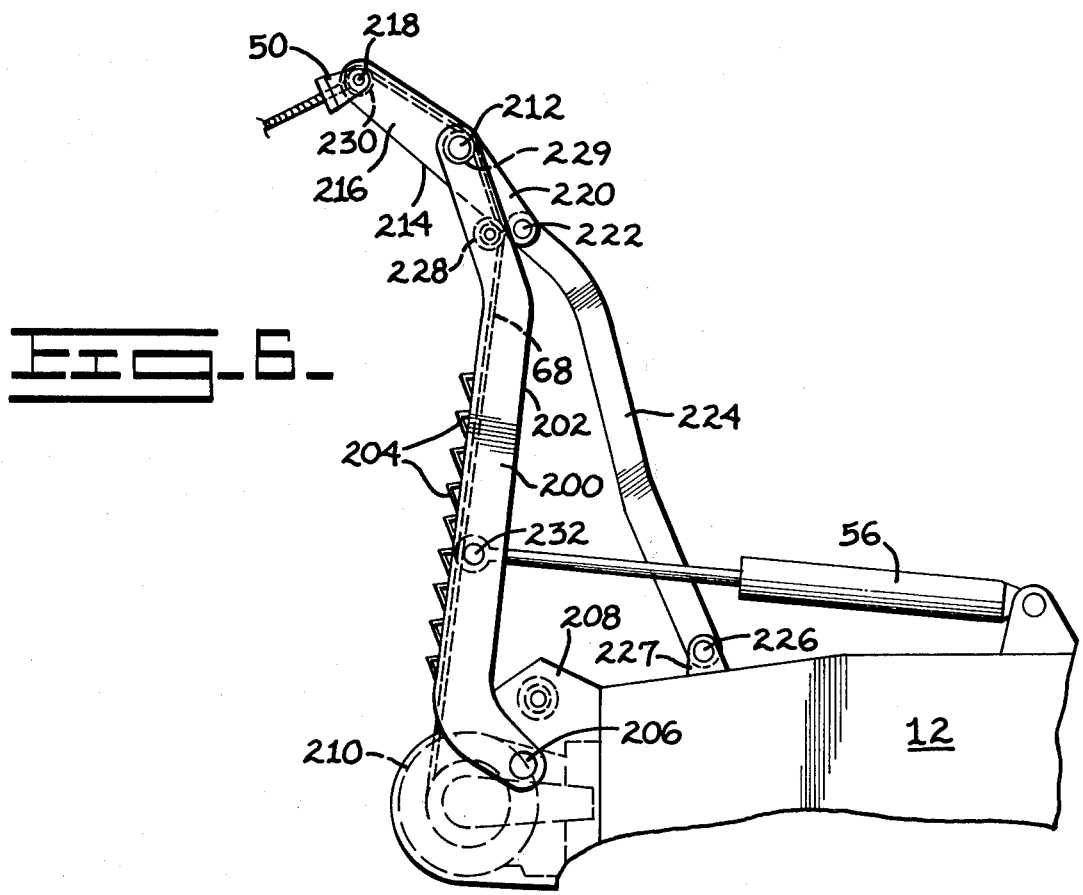

LOG SKIDDER WITH FOLDING ARCH

BACKGROUND OF THE INVENTION

This invention relates to log skidders or the like for dragging heavy loads such as logs through rough terrain.

In many operations, such as timber harvesting operations, it is often necessary to move, by dragging, loads such as logs over rough terrain. In a timber harvesting operation, for example, the point at which trees are felled may be quite remote from a loading point or the like. Consequently, skidding vehicles, such as log skidders, have been utilized to drag such loads across rough terrain from one point to another.

Many conventional log skidders in use today have fixed arch assemblies, that is, the boom-like assembly on the vehicle frame to which one end of the log to be skidded is attached as, for example, by a grapple or a fairlead and choker assembly. Because the end of the logs to be secured to the vehicle must be elevated to facilitate skidding, the arch assemblies extend a fair distance above the underlying terrain and, because the logs are to be dragged, the arch assembly is typically located near the rear of the vehicle. As a consequence, abrupt forces caused by the logs dragging over uneven terrain are directed to the vehicle at a relatively high location which produces rearward pitching of the vehicle and poor ground pressure distribution of the ground engaging means of the vehicle which produces ground disturbance and reduces traction. Obviously, rearward pitching is undesirable as an impediment to good handling qualities of the vehicle. Poor traction is undesirable due to its deleterious effect on vehicle handling qualities as well as promoting the possibility that the vehicle may become mired in a particular location. A high degree of ground disturbance is likewise undesirable, particularly where a vehicle must traverse substantially the same path several times since, as the ground progressively becomes more and more disturbed with each passing vehicle, traversing the path becomes increasingly difficult.

In an attempt to at least partially overcome one or more of the above difficulties, the prior art has resorted to pivoted arch assemblies and at least one log skidder having a pivoted arch assembly is commercially available today. In that vehicle, the arch extends rearwardly of the vehicle when logs are to be loaded and is pivoted forwardly on the vehicle to hoist the logs into a skidding condition. A choker type load carrying device is utilized and, as a consequence, the point of attachment of the fairlead when the arch is in a skidding position is relativey high on the vehicle and intermediate the ends of the vehicle frame. The latter factor improves weight distribution on the vehicle which includes traction and tends to reduce ground disturbance. However, because of the high location of the point of attachment of the fairlead, forces conveyed to the vehicle are applied thereto well above its center of gravity so that rearward pitching movements and any ground disturbances caused by such movement remain as problems accompanying the use of such vehicles.

SUMMARY OF THE INVENTION

The present invention is directed to overcoming one or more of the above problems.

According to the present invention, there is provided a log skidder or the like including a vehicle having a frame with front and rear ends. Ground engaging means are disposed on the frame so that the vehicle may traverse the underlying terrain. An elongated boom is on the frame and mounted thereto for pivotal movement about a generally horizontal axis. Load engaging means are provided and a lever mounts the load engaging means at one end. The lever is also horizontally pivoted at a location remote from the one end to the boom and at a location spaced from the horizontal axis of the boom. The lever one end extends rearwardly with relation to the frame. Means are provided on the frame for moving the boom between the positions thereon and means are provided for maintaining the lever one end directed generally rearwardly through all positions of the boom on the frame.

Other objects and advantages will become apparent from the following specification taken in connection with the accompanying drawings.

DESCRIPTION OF THE DRAWINGS

FIG. 4 is a schematic illustrating the position of various components of the embodiments shown in FIG. 1 at various points in boom travel;

FIG. 5 is a fragmentary, side elevation of a modified embodiment of the invention; and FIG. 6 is a fragmentary, side elevation of still another modified embodiment of the invention.

DESCRIPTION OF THE PREFERRED EMBODIMENTS

Figure 1:
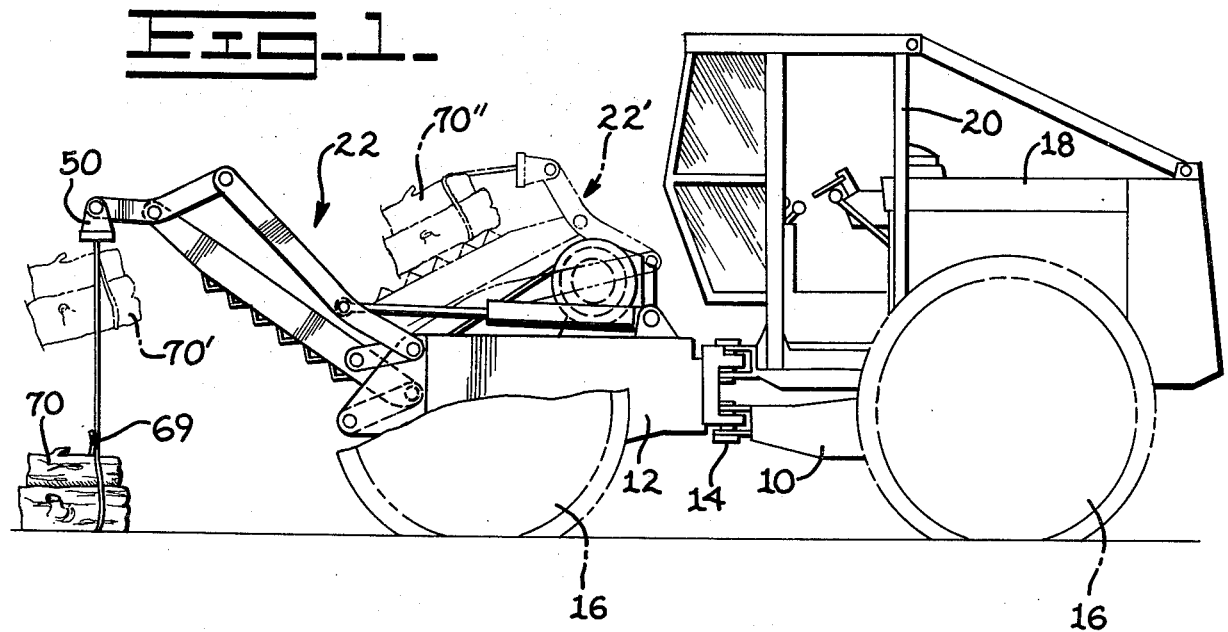
FIG. 1 is a side elevation of a log skidding vehicle made according to the invention with parts broken away for clarity.

An exemplary embodiment of a log skidding vehicle or the like made according to the invention is illustrated in FIG. 1 and is seen to include an articulated vehicle including a forward frame 10 and a rearward frame 12 suitably pivotally interconnected at 14 by means well known in the art. Both frames 10 and 12 mount ground engaging means in the form of wheels 16 so that the vehicle can traverse the underlying terrain.

The forward frame 10 additionally mounts an engine housed in a compartment 18 and an operator cab 20 including suitable vehicle controls. The rear frame 12 mounts a folding arch, generally designated 22, made according to the invention.

Figure 2:
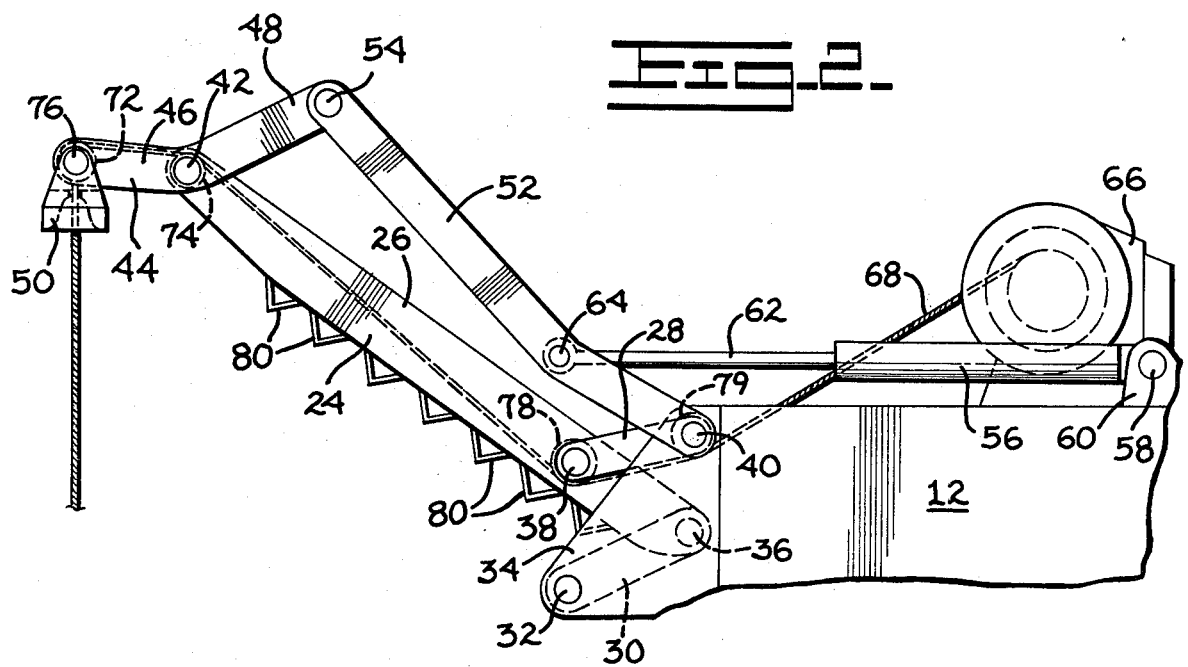
FIG. 2 is an enlarged, side elevation of a boom and related structure employed on the vehicle.
Figure 3:
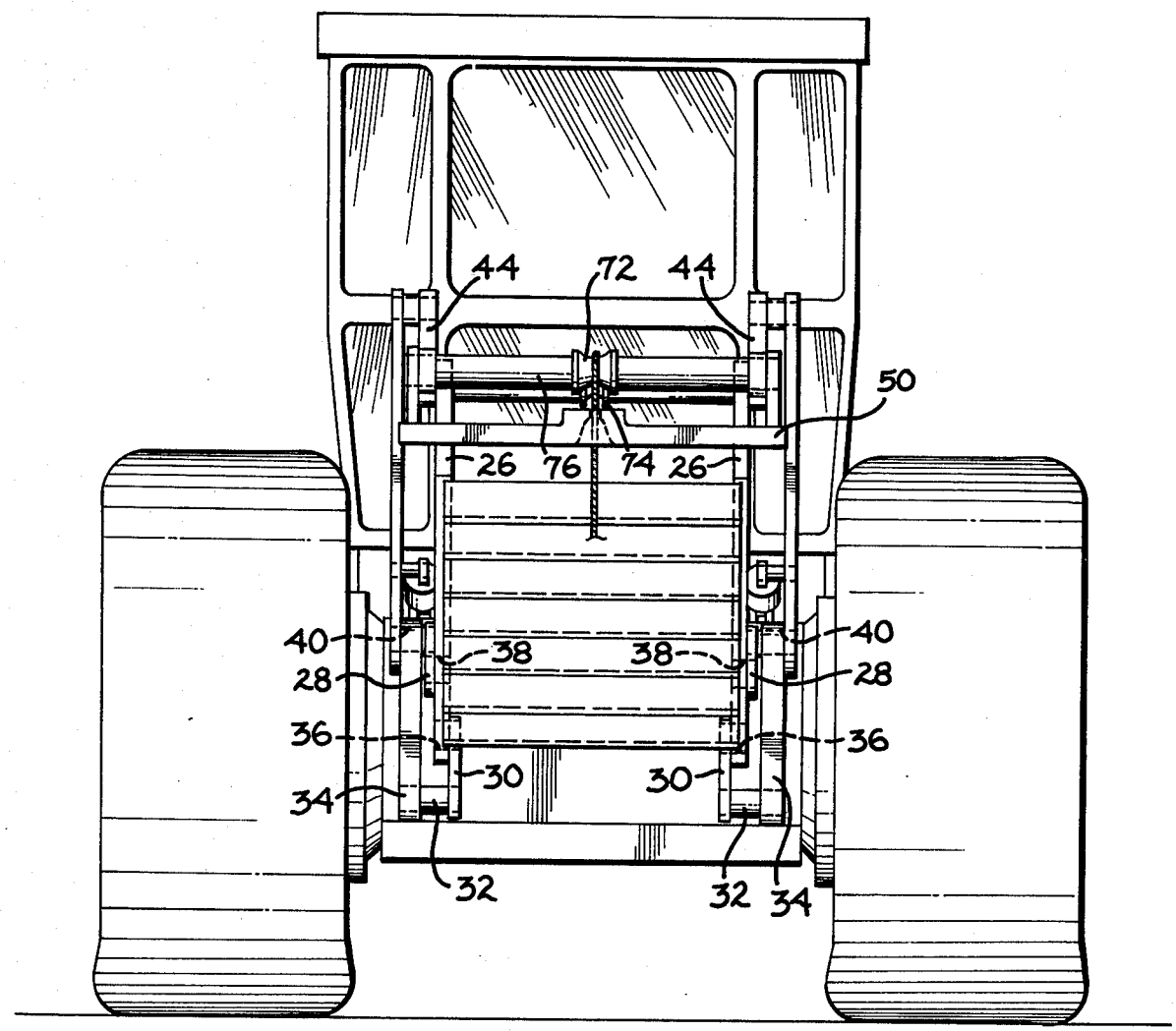
FIG. 3 is a rear view of the vehicle.

Referring to FIGS. 2 and 3, the folding arch 22 includes a boom 24 formed of elongated, spaced supports 26. The boom 24 is pivoted to the rear of the frame 12 by two sets of tag links 28 and 30. The tag links 30 have their lower ends pivoted by shafts 32 to rearwardly extending plates 34 projecting rearwardly from the frame 12 and their upper ends directed forwardly and pivotally connected by a shaft 36 to respective lower ends of the supports 26.

The tag links 28 have their rearwardmost ends pivoted by shafts 38 to the supports 26 intermediate the ends of the same. The opposite ends of the tag links 28 are pivotally connected as by a shaft 40 to the plates 34. The tag links 28 and 30, along with the various shafts which are all disposed on a horizontal axis, constitute a means for pivoting the boom 24 to the vehicle frame 12.

The opposite end of the boom 24 horizontally pivotally mounts by means of a shaft 42, a bellcrank 44. One arm 46 of the bellcrank 44 extends rearwardly with relation to the vehicle from the shaft 42 while another arm 48 extends forwardly in relation to the shaft 42. The rearward end of the arm 46 pivotally mounts a conventional fairlead 50. As seen in FIG. 3, two of the bellcranks 44 are utilized, one associated with each support 26 and the fairlead 50 extends between the two.

Links 52 pivotally interconnect the forewardmost ends of the bellcranks 44 and the frame 12. Specifically, each of the links 52 has one end pivoted to the frame 12 by means of the shaft 40 and its opposite end pivoted to the forwardmost end of the arm 48 of the bellcrank 44 by a pivot 54.

A pair of hydraulic cylinders 56, one for each of the links 52, has its cylinder end pivoted by a pin 58 to an upstanding tongue 60 mounted on the frame 12 and its rod 62 pivoted by a pin 64 to an associated one of the links 52 intermediate the ends of the latter.

The forward part of the rear frame 12 mounts a conventional cable winch 66 and a cable 68 extends therefrom through the path illustrated and through the fairlead 50 to terminate in a choker 69 (FIG. 1) which serves as a load engaging means for, for example, logs 70. Sheaves are provided to guide the cable through the path illustrated, two such sheaves 72 and 74 being clearly illustrated in FIG. 3. The sheave 72 is disposed on a shaft 76 by which the fairlead 50 is secured to the bellcrank arms 46 while the sheave 74 is mounted on the shaft 42. A similar sheave 78 is disposed on the shaft 38 and finally, a sheave 79 is located on the shaft 40.

Because the sheaves 72, 74, 78 & 79 are all rotatable about respective axes of the pivotal connections the levers, links, booms and frame to each other, regardless of the angular relation of, for example, the link 28 to the boom 24, the length of the cable 68 between the various sheaves will remain constant as will the length of the cable from the winch 66 to the fairlead 50; and this will be true for all positions of the boom. Thus, once the choker 69 is in desired proximity to the fairlead 50, subsequent movement of the boom 24 will neither allow the choker 69 to move away from the fairlead 50 nor pull the choker 69 into the fairlead 50.

The embodiment of FIG. 1 is completed by a plurality of angle irons 80 which extend between and are mounted on the supports 26 over a majority of the length of the latter. The angle irons 80 define a cradle, as will be seen. FIG. 1, in solid lines, illustrates the position of the arch 22 in a loading position. The choker 69 is secured to logs 70. The winch 66 may then be operated to draw the choker 69 close to the fairleads 50 so that the log 70 will assume the dotted line position illustrated at 70'.

Thereafter, the cylinders 56 may be retracted to move the arch into the dotted line position shown at 22' so that the logs will assume the dotted line position illustrated at 70". In the latter position, the folding arch is in a vehicle and the attachment of the arch to the logs is at a lowered position disposed between the front and rear end of the vehicle and the attachment of the arch to the logs is at a relatively low level which is much lower than the level of attachment for an identically sized vehicle employing a prior art arch construction. The logs will also be partially supported by the cradle 80. As a consequence, weight distribution on the vehicle tends to be more equalized than for various prior art constructions providing for good traction. In addition, because the point of attachment of the arch to the log is relatively low, the center of gravity of the vehicle and its load will be lower than that heretofore obtainable, with the result that vehicle stability and thus handling qualities are significantly improved while ground disturbance is minimized.

FIG. 4 illustrates, in schematic form, the path of travel of various identified points in the system. It will be appreciated that at all times, the arm 46 of the bellcrank 44 is directed rearwardly so that the fairlead 50 is always interposed between the load and the arch 22. At the same time, as the arch moves towards its lowered position forwardly on the vehicle, the fairlead moves in a relatively high arc to sufficiently lift the ends of the log 70 well above the cradle surfaces 80 to prevent their snagging thereagainst before the final lowered position is achieved. It will also be appreciated from FIG. 4 that once the apex of the path of movement of the fairlead 50 is reached during holding movement to the lowered position, the fairlead lowers relatively abruptly with minimal rear to forward movement that could cause undesirable snagging of the logs 70 on the cradle surfaces 80 and yet deposits the log ends on the cradle surfaces 80 to support the log ends and provide the desired weight distribution mentioned previously.

A further embodiment is illustrated in FIG. 5 and is seen to include a boom 100 formed of two elongated supports 102, only one of which is shown. The lower end of the supports 102 are pivoted by a shaft 104 to side plates 106 extending rearwardly from the frame 12. The upper end of the supports 102 journal, by a shaft 108, bellcranks 110 having a rearwardly directed arm 112 and a forwardly directed arm 114. The rearward end of each arm 112, by means of a pivot 116, pivotally mounts a link 118 intermediate its ends. The rearwardmost end of each link 118 pivots, by a shaft 120, the fairlead 50. Angle irons 124 extend between the supports 102 to form a cradle in the same manner as mentioned previously and hydraulic cylinders 56 are pivoted to the frame 12 and have their rods 62 pivoted by a shaft 126 to the supports 102.

A pair of links 128 pivotally interconnect the bellcranks 110 and the frame 12. The links 128 are S-shaped and have their lower ends pivoted by pins 130 to the plates 106 below the shaft 104 and their upper ends pivoted by pins 132 to the ends of the arms 114 of corresponding ones of the bellcranks 110. Links 136 are pivoted by pins 138 to the links 128 intermediate the ends of the latter but near the upper ends thereof and to the forwardmost ends of corresponding ones of the links 118.

The cable winch 66 is employed as before and includes the cable 68 which extends through the path shown to a load engaging means in the form of the choker 69 (not shown). Sheaves 142 at the locations illustrated assure that when the winch 66 is not being operated, the length of cable 68 between the winch 66 and the load engaging means will remain constant irrespective of the position of the boom 100 with respect to the vehicle, as will be appreciated by those skilled in the art. This feature provides the advantage mentioned previously in connection with the description of the embodiment shown in FIGS. 1-4, inclusive.

As shown in FIG. 5, the arch is in its loading, or uppermost position and can be folded to a lower position located principally between the ends of the vehicle frame. During such movement, the nature of the linkage is such that the point defined by the pivot 120 will move slightly upwardly and forwardly while the point defined by the pins 140 will initially move upwardly and then forwardly and downwardly. Similarly, initially, the shaft 132 will move upwardly with some forward movement and eventually begin to move downwardly. The point 138 will always move forwardly, initially with a slight upward component and finally moving downwardly. Thus, it will be appreciated that the embodiment illustrated in FIG. 5 provides the same advantages enumerated previously in connection with the embodiment illustrated in FIGS. 1-4, inclusive.

FIG. 6 illustrates still a further embodiment of the invention. There is provided a boom 200 defined by two S-shaped, elongated supports 202 which are spaced. Cradle defining angle irons 204 extend between the supports 202 and the lower ends of the supports 202 are pivoted by pins 206 to rearwardly extending plates 208 secured to the rear of the frame 12. The plates 208 also mount a cable winch 210.

The upper ends of the supports 202 mount a shaft 212 which, in turn, mounts, intermediate its ends, bellcranks 214. The bellcranks 214 each include a rearwardly extending arm 216 and the rearwardmost end thereof pivotally mounts, at 218, the fairlead 50. Each of the bellcranks 214 includes a forwardly extending arm 220 and the forwardmost end thereof mounts a shaft 222 which is pivoted to a pair of spaced links 224. The lower end of the links 224 are pivoted by pins 226 to upstanding tongues 227 adjacent the rear of the rear frame 12.

A cable 68 extends from the winch 210 about an idler sheave 228 intermediate the ends of the supports 202, a sheave 229 supported by the shaft 212 and a sheave 230 supported by the shaft 218. Preferably, the winch 210 is located very closely to the pivot point 206 for the lower ends of the arms 202 so that, for the reasons mentioned previously, when the winch 210 is inactive, the length of cable 68 between the winch and the load engaging means (not shown) will not appreciably change irrespective of the position of the boom 200 with respect to the vehicle.

Cylinders 56 are employed and are pivotally connected at 232 to the supports 202. FIG. 6 illustrates the configuration of the components when logs are about to be loaded with the arch in its upright position. When it is desired to move the arch to its lowered position, the cylinders 56 are retracted with the consequence that supports 202 will be pivoted forwardly about the pivot point 206. At the same time, the links 224 will cause the pivot point 222 to move upwardly and forwardly and finally forwardly and downwardly. At this time, the pivotal connection 218 of the bellcranks 214 to the fairlead 250 will move downwardly and forwardly to lower the logs onto the cradle defined by the angle irons 204. Again, it will be appreciated that at all times, the arm 216 of the bellcranks 214 will be directed substantially entirely rearwardly to avoid undesirable, premature interference of the load with the cradle surfaces.

With respect to all embodiments, the illustrated routing of the cable 68 represents a preferred routing. However, those skilled in the art will appreciate that other routes, including direct routes to the fairleads, can be used where desired.

From the foregoing, those skilled in the art will readily appreciate that a log skidder or similar vehicle made according to the invention minimizes or eliminates problems heretofore present in terms of improving vehicle handling capability, improving traction and load distribution, and minimizing or eliminating ground disturbance.

The embodiments of the invention in which an exclusive property or privilege is claimed are defined as follows:

1. A log skidder or the like comprising:
a vehicle including a frame having front and rear ends;
ground engaging means on said frame whereby said vehicle may traverse the underlying terrain;
an elongated boom on said frame and mounted thereto for pivotal movement about a generally horizontal axis between an extended position adjacent said rear end and a retracted position intermediate said ends;
load engaging means;
lever means mounting at one end said load engaging means and horizontally pivoted at a location remote from said lever means one end to said boom at a location spaced from said horizontal axis, said lever means one end extending rearwardly with relation to said frame and having a lesser length than said boom;
means on said frame for moving said boom between said positions;
means for maintaining said lever means one end directed generally rearwardly through all positions of said boom on said frame including a linkage interconnecting said lever means and said frame; and
a log receiving cradle carried by said boom and located to be facing upwardly and below said lever means one end when said boom is in said retracted position.

2. A log skidder or the like, comprising:
a vehicle including a frame having front and rear ends;
ground engaging means on said frame whereby said vehicle may traverse the underlying terrain;
an elongated boom on said frame and mounted thereto for pivotal movement about a generally horizontal axis between an extended position adjacent said rear end and a retracted position intermediate said ends;
load engaging means;
lever means mounting at one end said load engaging means and horizontally pivoted at a location remote from said lever means one end to said boom at a location spaced from said horizontal axis, said lever means one end extending rearwardly with relation to said frame and having a lesser length than said boom;
means on said frame for moving said boom between said positions;
means for maintaining said lever means one end directed generally rearwardly through all positions of said boom on said frame including a linkage interconnecting said lever means and said frame; and
a winch mounted on said frame, a cable connected to said load engaging means and said winch, and cable guides on said boom and located so that the length of the cable extending between said winch and said load engaging means will remain substantially constant for all positions of said boom with respect to said frame when said winch is not being utilized.

3. A log skidder or the like comprising:
a vehicle including a frame having front and rear ends;

ground engaging means on said frame whereby said vehicle may traverse the underlying terrain;

an elongated boom;

means pivotally mounting said boom to said frame adjacent said rear end for rotation about a generally horizontal axis;

a bellcrank horizontally pivoted to said boom at a location spaced from said horizontal axis and having a shorter length than said boom;

moving means interconnecting said boom and said frame for pivoting said boom on said frame;

load carrying means connected to one end of said bellcrank;

a link horizontally pivotally connected to the other end of said bellcrank and to said frame; and said pivotal mounting means comprising two tag links, one horizontally pivotally connected to said boom intermediate its ends and to said frame, and the other horizontally pivoted to said boom and to said frame at locations different from said one link.

4. A log skidder or the like comprising:

a vehicle including a frame having front and rear ends;

ground engaging means on said frame whereby said vehicle may traverse the underlying terrain;

an elongated boom;

means pivotally mounting said boom to said frame adjacent said rear end for rotation about a generally horizontal axis;

a bellcrank horizontally pivoted to said boom at a location spaced from said horizontal axis and having a shorter length than said boom;

moving means interconnecting said boom and said frame for pivoting said boom on said frame;

load carrying means connected to one end of said bellcrank;

a link horizontally pivotally connected to the other end of said bellcrank and to said frame;

said load carrying means being connected to said bellcrank one end by a second link horizontally pivotally connected, intermediate its ends, to said one end and further including a third link horizontally pivotally connected to said second link at an end thereof remote from said load carrying means and to saif first mentioned link at a location intermediate said frame and said bellcrank other end.

5. A log skidder or the like comprising:

a vehicle including a frame having front and rear ends;

ground engaging means on said frame whereby said vehicle may traverse the underlying terrain;

an elongated boom;

means pivotally mounting said boom to said frame adjacent said rear end for rotation about a generally horizontal axis;

a bellcrank horizontally pivoted to said boom at a location spaced from said horizontal axis and having a shorter length than said boom;

moving means interconnecting said boom and said frame for pivoting said boom on said frame;

load carrying means connected to one end of said bellcrank;

a link horizontally pivotally connected to the other end of said bellcrank and to said frame;

said boom being defined by two laterally spaced, elongated supports; and a log receiving cradle extending between said supports and located to be disposed below said bellcrank one end when said boom is pivoted to a retracted position on said frame.

6. A log skidder or the like comprising:

a vehicle including a frame having front and rear ends;

ground engaging means on said frame whereby said vehicle may traverse the underlying terrain;

an elongated boom;

means pivotally mounting said boom to said frame adjacent said rear end for rotation about a generally horizontal axis;

a bellcrank horizontally pivoted to said boom at a location spaced from said horizontal axis and having a shorter length than said boom;

moving means interconnecting said boom and said frame for pivoting said boom on said frame;

load carrying means connected to one end of said bellcrank;

a link horizontally pivotally connected to the other end of said bellcrank and to said frame;

a cable winch mounted on said frame;

a cable interconnecting said winch and said load carrying means; and cable guides engaging said cable at said pivotal mounting means and the pivotal connection of said bellcrank to said boom, whereby the length of cable between said load carrying means and said winch will remain substantially constant for all positions of said boom on said frame when said winch is not being utilized.

* * * * *